United States Patent
Olsen et al.

(10) Patent No.: US 11,602,707 B2
(45) Date of Patent: Mar. 14, 2023

(54) PRESSURE TANK CONDENSATION SEPARATOR

(71) Applicant: Toledo Molding & Die, LLC, Toledo, OH (US)

(72) Inventors: Robert Olsen, Monroe, MI (US); Robert Hance, Highland Township, MI (US); James Papke, Temperance, MI (US)

(73) Assignee: Toledo Molding & Die, LLC, Toledo, OH (US)

( * ) Notice: Subject to any disclaimer, the term of this patent is extended or adjusted under 35 U.S.C. 154(b) by 0 days.

(21) Appl. No.: 17/477,104

(22) Filed: Sep. 16, 2021

(65) Prior Publication Data

US 2022/0096982 A1 Mar. 31, 2022

Related U.S. Application Data

(60) Provisional application No. 63/083,502, filed on Sep. 25, 2020.

(51) Int. Cl.
*B01D 53/26* (2006.01)
*B01D 45/08* (2006.01)
*B01D 45/06* (2006.01)

(52) U.S. Cl.
CPC ............. *B01D 45/08* (2013.01); *B01D 45/06* (2013.01); *B01D 53/265* (2013.01)

(58) Field of Classification Search
CPC ....... B01D 45/08; B01D 45/06; B01D 53/265
See application file for complete search history.

(56) References Cited

U.S. PATENT DOCUMENTS

| | | | | |
|---|---|---|---|---|
| 3,500,796 A | * | 3/1970 | Roffler | B01D 45/08 |
| | | | | 122/483 |
| 9,308,480 B2 | * | 4/2016 | Leiss | A47L 9/165 |
| 2001/0004879 A1 | * | 6/2001 | Umotoy | B01D 8/00 |
| | | | | 55/355 |
| 2005/0000572 A1 | * | 1/2005 | Muller | F17D 1/005 |
| | | | | 137/561 A |
| 2011/0309162 A1 | * | 12/2011 | Rock | C02F 1/04 |
| | | | | 239/289 |
| 2016/0175749 A1 | * | 6/2016 | Suda | B01D 45/04 |
| | | | | 95/267 |

FOREIGN PATENT DOCUMENTS

| | | | | | |
|---|---|---|---|---|---|
| EP | 2974782 A1 | * | 1/2016 | ........... | B01D 46/003 |
| FR | 2892159 A3 | * | 4/2007 | ........... | B01D 53/265 |
| JP | 2018096239 A | * | 6/2018 | ............ | B01D 45/06 |
| KR | 20060060906 A | * | 6/2006 | ............ | B01D 45/08 |

* cited by examiner

*Primary Examiner* — Dung H Bui
(74) *Attorney, Agent, or Firm* — McHale & Slavin, P.A.

(57) ABSTRACT

A pressure tank condensation separator having an interior chamber forming a downflow path on a first side and an upflow path on a second side passing through horizontally positioned shelves; each shelf having at least one passageway positioned to cause a tortuous air path wherein moisture is separated and deposited on each shelf. The shelves are sloped, leading to drain holes for directing moisture collected to a purge valve. The removal of moisture is most beneficial to clean radar sensors, LIDAR and video cameras used on autonomous vehicles.

8 Claims, 2 Drawing Sheets

PRESSURE TANK CONDENSATION SEPARATOR

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 63/083,502, entitled "PRESSURE TANK CONDENSATION SEPARATOR", filed Sep. 25, 2020. The contents of which the above referenced application is incorporated herein by reference.

FIELD OF THE INVENTION

This invention is directed to the field of storage tanks; and in particular, to a pressure tank condensation separator.

BACKGROUND OF THE INVENTION

Compressed air is used for a variety of purposes on vehicles, such as air suspensions, autonomous vehicle sensor cleaning, as well as braking systems. The compressed air is made on board by use of an air compressor, the size and operational aspects of which can lead to various levels of condensation. For instance, a small air compressor may run continuously, resulting in the compressed air produced becoming hot. A large air compressor may run periodically, but again, the operation of which can result in the compressed air produced becoming hot. It is not uncommon for an air compressor to heat up to 100 degrees Centigrade. Once the heated air is passed on, the cooling process can quickly cause condensation to develop. In some instances, a heat exchanger may be used to lower air temperature to protect components from the heat, again leading to condensation. Simple storing of the hot compressed air can lead to condensation when the compressed air begins to cool. A dryer may be used to condition the hot air, but a dryer may not keep up with large shifts in temperature and the resulting excess moisture that is being produced.

Autonomous vehicles require radar sensors to detect objects in the vehicles path. Such vehicles also employ laser radar (LIDAR) to scan the vehicle's surroundings to calculate what objects the vehicle needs to avoid. Video cameras are used to identify road markings and traffic signals. The sensors and cameras must be clean of debris for proper operation. Compressed air is well suited for blowing debris away from the sensors and cameras, but excess moisture must be removed or the water laden compressed air is not effective.

In another example, brake systems found on trucks require the removal of moisture to keep the braking system at peak capacity and extend the life of the brake components and relay valves. Excess moisture in the braking system results in reduced braking efficiency and brake system longevity. Air brakes rely upon pressurized air to operate; the heat of the pressurized air is a direct result of air compressor operation. If the brakes are applied excessively, such as when using a vehicle in stop and go city traffic or downhill braking, the air compressor can heat up the air it is generating. Cooling hot air quickly can result in condensation in the air system. A dryer may be used to condition the hot air, but a dryer may not keep up with large shifts in temperature and the resulting excess moisture that is being produced. Moisture must be removed from the air tanks to keep the braking system at peak capacity.

What is needed is a device to reduce the condensation caused by the use of compressed air in a vehicle.

SUMMARY OF THE INVENTION

A pressure tank condensation separator having an interior chamber with a vertically disposed wall forming a downflow path on a first side of the interior chamber from an air inlet and an upflow path on a second side of the interior chamber leading to an air outlet. Shelves are positioned horizontally in the chamber, each shelf having at least one downflow passageway positioned in the first side of the interior chamber and at least one upflow passageway positioned in the second side of the interior chamber. An aperture fluidly couples the first side of the interior chamber to the second side of the interior chamber. Each shelf includes a drain hole on the first side of the interior chamber and a drain hole on the second side of the interior chamber. A purge valve is positioned at the bottom of the tank, whereby compressed air is inserted into the first chamber, follows the first side downflow path through the aperture and the second side upflow path, and exits said air outlet using a torturous path wherein condensation from compressed air is deposited on the surface of the shelves and directed through the drain holes for expulsion by the purge valve.

An objective of the invention is to provide a high pressure tank condensation separator wherein air flow follows a torturous path through chambers to displace the condensation from the air flow, wherein condensation flows through drain holes to a purge valve.

Another objective of the invention is to provide a condensation separator having sloped shelves that allow draining of condensation from the air flow.

Still another objective of the invention is to provide a condensation separator formed of two pieces using injection molded plastic; the two pieces being welded together to provide a low cost assembly.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
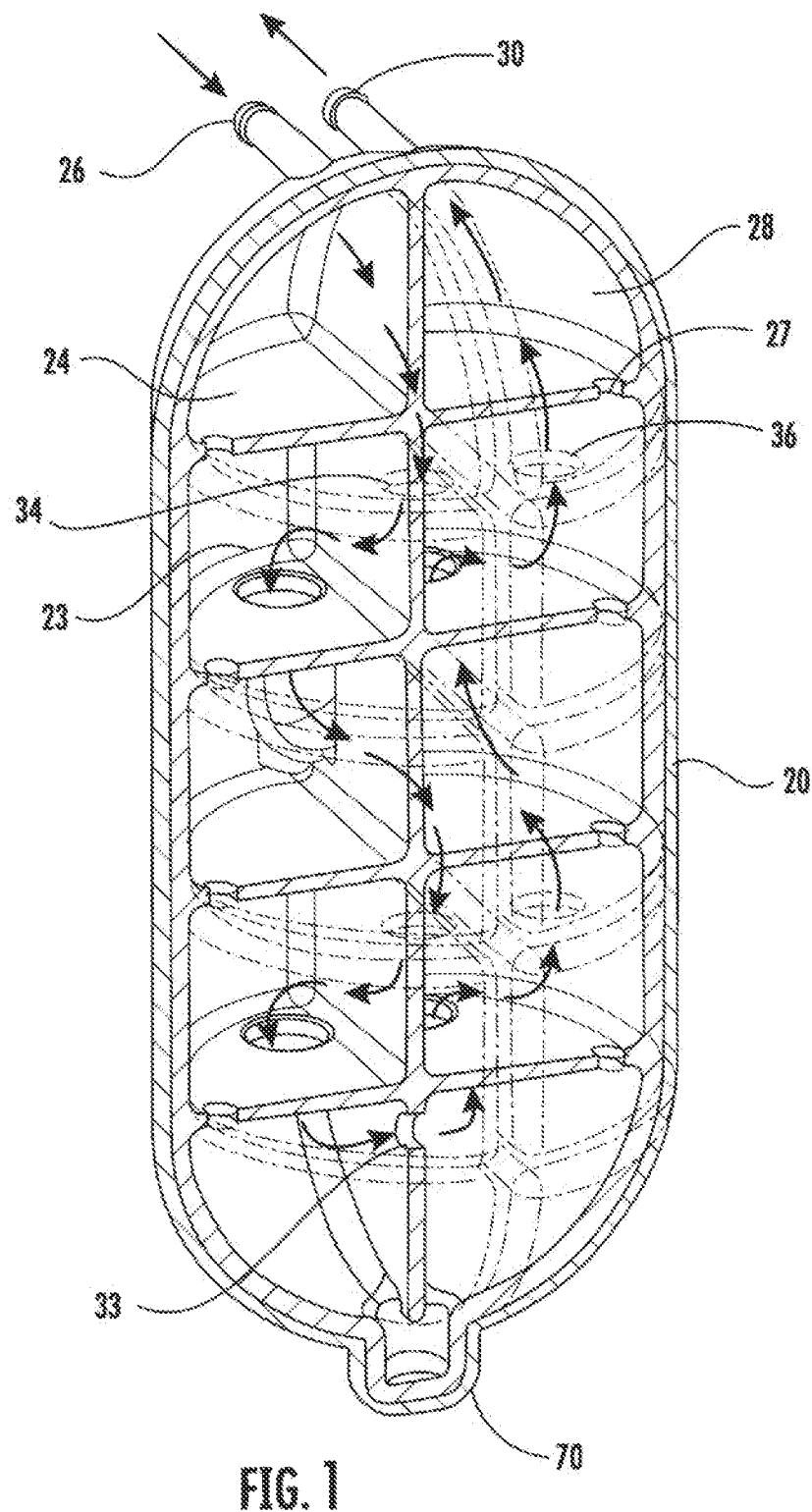
FIG. 1 is a pictorial view of the pressure tank condensation separator of the instant invention.
Figure 2:
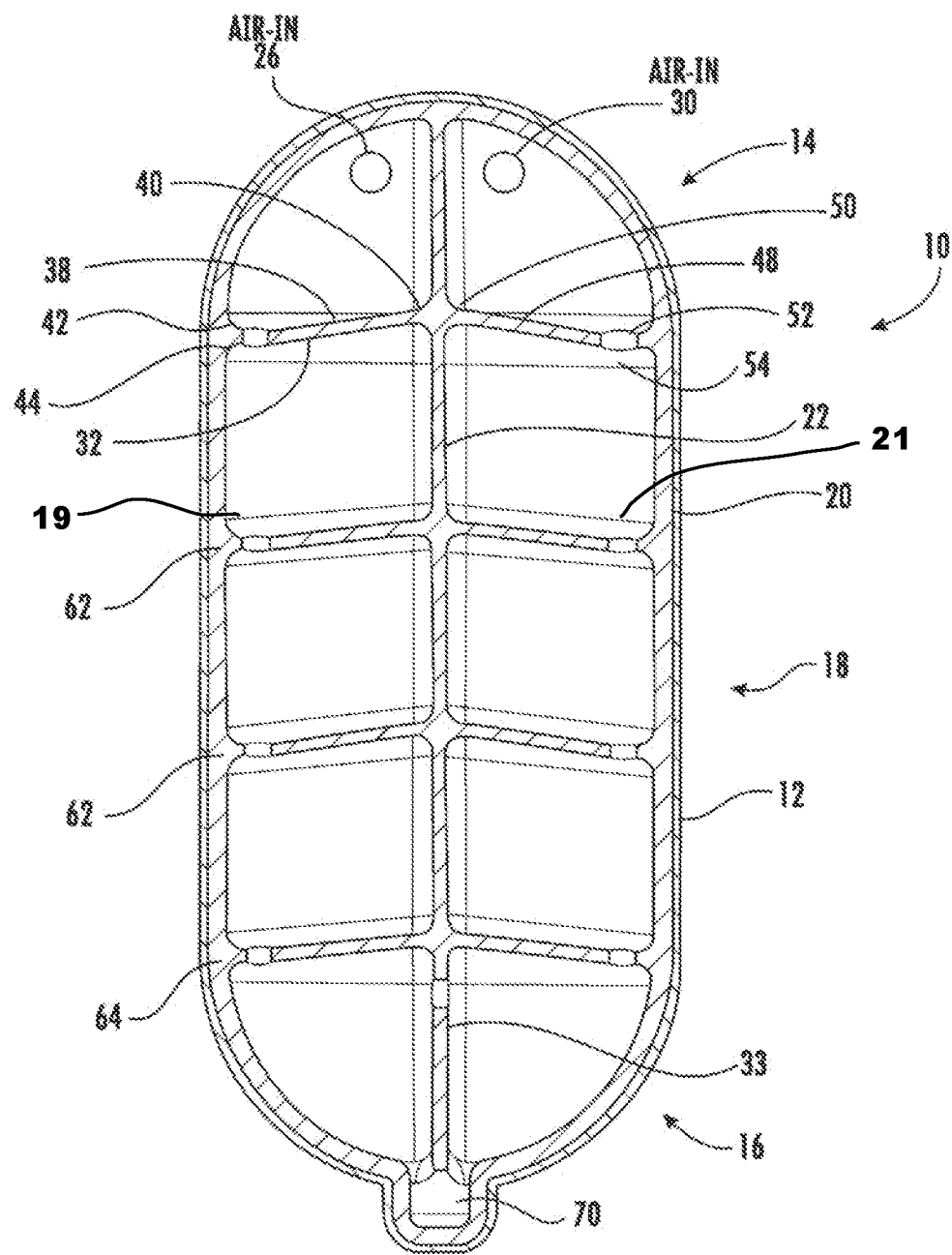
FIG. 2 is a cross sectional side view thereof.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the figures, disclosed is a condensation separator 10 formed from an oblong shaped tank 12 having an upper hemispherical end 14 separated from a lower hemispherical end 16 by a cylindrical sidewall 18 forming an interior chamber 20. The interior chamber 20 has a vertically disposed wall 22 with a first corner 19 forming a downflow path 23 on a first side 24 of the interior chamber 20 from an air inlet 26 and an upflow path 27 on a second side 28 of the interior chamber 20 along a second corner 21 leading to an air outlet 30. In this embodiment, a first shelf 32 is positioned horizontally in the interior chamber 20 extending from the first side 24 to the second side 28.

The first shelf 32 includes a downflow passageway 34 positioned in the first side 24 of the interior chamber 20. An upper surface 38 of the shelf 32 on the first side 24 is sloped from a raised inner edge 40 to a lower outer edge 42 leading to a drain hole 44. The first shelf 32 includes an upflow passageway 36 positioned in the second side 28 of the interior chamber 20. An upper surface 48 of the shelf 32 on the second side 28 is sloped from a raised inner edge 50 to a lower outer edge 52 leading to drain hole 54. Each shelf slope is between 1 and 5 degrees. Per the illustrations, shelves 60, 62, and 64 are positioned within the interior chamber, each of which form a duplicate of the first shelf 32. As each shelf, which extends from the first side 24 to the second side 28 is duplicate of the first shelf 32, for drawing clarity for the detail of the additional shelves with not be further numbered, and it is understood that element numbering of the additional shelves are also duplicative of the first shelf 32. The illustration depicts four shelves 32, 60, 62, and 64 for illustration purposes only, the four shelves may also be referred to as eight shelves as the vertical wall 22 separates the first side 24 as the downflow passageway 34 and the second side 28 as the upflow passageway 36. It is further noted that additional shelves can be employed to provide greater surface area for condensation trapping by furthering the torturous path through the passageways. In the preferred embodiment, the tank 12 requires at least two shelves (four if counted separately) with units contemplated to have up to twelve shelves (twenty-four if counted separately). Air flow from the downflow passageway 34 of the first side 24 is passed to the upflow passageway 36 on the second side 28 through a wall 22 aperture 33.

In the preferred embodiment, each downflow passageway 34 and upflow passageway 36 is about 15 mm in diameter, but may range between 10 mm to 25 mm. Each passageway may be smooth or include serrated edges and are arranged on each shelf so as to cause air flow to cross through the individual sections formed by each shelf in a torturous flow pattern. With the formed passageway, moisture is separated from passing air and deposited on the shelves and walls of the chamber, wherein the sloped surface of each shelf causes toe moisture to collect at the drain holes 44, 54 where the moisture falls to the bottom section 16 and is collected at a purge valve 70. The purge valve 70 is opened periodically to discharge collected moisture. The purge valve 70 can be made to automatically open at timed intervals by use of moisture sensors, or at intervals when condensation is known to have occurred, such as vehicle startup.

While the instant embodiment depicts an oblong tank 12 placed in a vertical position, one skilled in the art would understand the tank can be modified to be placed in a horizontal position, which is considered within the scope of this invention.

In a preferred embodiment, the pressure tank condensation separator 10 is constructed from plastic, such a polypropylene. In this embodiment, the condensation separator 10 is formed from either a one-piece or two-piece mold. For instance, the device can be formed in a single piece mold and welded together. A two-piece mold can also be used, allowing placement of the air inlet 26 and outlet 30 along a same side. Injection molding allows placement of the drain holes, passageways and apertures with each side matching the other to complete the drain holes, passageways and apertures. Materials of construction can be adjusted for various pressure ratings; the preferred embodiment is constructed and arranged to operate at about 50 psi air pressure.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:
1. A condensation separator including:
   a tank having an upper hemispherical end separated from a lower hemispherical end by a cylindrical sidewall forming an interior chamber;

said interior chamber having a vertically disposed wall extending from said upper hemispherical end to said lower hemispherical end forming a first side of said interior chamber with an air inlet extending from said first side upper hemispherical end and a second side of said interior chamber having an air outlet extending from said second side of said upper hemispherical end;

at least two shelves forming an upper shelf and a lower shelf positioned horizontally in said chamber and dissected by said vertically disposed wall defining semi circular surfaces with a first corner and a second corner abutting said vertically disposed wall, each said shelf having a downflow passageway positioned alternately between said first corner and said second corner in said first side of said interior chamber, and each shelf having an upflow passageway positioned alternately between a first corner and a second corner in said second side of said interior chamber;

an aperture fluidly coupling said first side of said interior chamber to said second side of said interior chamber beneath said lower shelf;

each said shelf including a centrally disposed drain hole between said first and second corner on said first side of said interior chamber and a centrally disposed drain hole between said first and second corner on said second side of said interior chamber;

and a purge valve positioned at the lower hemispherical end of said tank;

whereby compressed air is inserted into said air inlet following said first side downflow passageway alternating through said apertures forming a torturous pathway and continuing said pathway through said second side upflow path, exiting said air outlet wherein condensation from said compressed air is deposited on said shelves and collected through said drain holes for expulsion through; further including at least two additional horizontally disposed shelves positioned between said upper shelf and said lower shelf, each said shelf including a corner aperture to continue said torturous pathway.

2. The condensation separator according to claim 1 wherein each said shelf is sloped toward each said drain hole.

3. The condensation separator according to claim 2 wherein each said shelf is sloped between 1 and 5 degrees toward said drain hole.

4. The condensation separator according to claim 1 wherein said tank, vertical wall and shelves are constructed from plastic.

5. The condensation separator according to claim 4 wherein said plastic is polypropylene.

6. The condensation separator according to claim 1 wherein said downflow passageways and said upflow passageways are between 10 mm and 25 mm in diameter.

7. The condensation separator according to claim 1 wherein said tank is constructed in two pieces with said vertical wall and shelves are formed integral thereto; wherein said two pieces are welded together to form said tank.

8. The condensation separator according to claim 7 wherein said tank is constructed and arranged to operate at about 50 psi air pressure.

* * * * *

UNITED STATES PATENT AND TRADEMARK OFFICE
CERTIFICATE OF CORRECTION

PATENT NO.         : 11,602,707 B2
APPLICATION NO.    : 17/477104
DATED              : March 14, 2023
INVENTOR(S)        : Olsen et al.

Page 1 of 1

It is certified that error appears in the above-identified patent and that said Letters Patent is hereby corrected as shown below:

In the Claims

Column 6, Claim 1, Line 4, after the word "through" insert -- said purge valve --.

Signed and Sealed this
Twenty-fifth Day of July, 2023

Katherine Kelly Vidal
*Director of the United States Patent and Trademark Office*